United States Patent

[11] 3,602,748

| [72] | Inventor | Gilbert I. Locke |
| | | 1425 Elgin Avenue, Forest Park, Ill. 60130 |
| [21] | Appl. No. | 808,255 |
| [22] | Filed | Mar. 18, 1969 |
| [45] | Patented | Aug. 31, 1971 |

[54] DOUBLE-VOLTAGE MOTOR CONNECTING DEVICE
6 Claims, 5 Drawing Figs.

[52] U.S. Cl. .................................................... 310/71, 339/31
[51] Int. Cl. .............................................. H02k 11/00
[50] Field of Search ............................................ 339/31, 32; 310/71; 318/220, 225

[56] References Cited
UNITED STATES PATENTS

| 3,453,403 | 7/1969 | Hoffman | 310/71 X |
| 2,552,028 | 5/1951 | Blair | 310/71 |
| 2,543,131 | 2/1951 | Seifried | 310/71 |
| 2,727,215 | 12/1955 | Brown | 339/32 |
| 3,231,767 | 1/1966 | Powell | 310/71 |

Primary Examiner—D. F. Duggan
Attorney—Johnson, Dienner, Emrich, Verbeck & Wagner ABSTRACT: Each terminal of a receptacle is adapted to be electrically connected to a specified one of the external leads of a three-phase double-voltage motor. The receptacle is adapted to be mounted to the housing of the motor. Respective low voltage and high-voltage jumper caps are adapted to be removably and interchangeability mounted to the receptacle. The low voltage jumper cap is used to make the necessary electrical connection in the external circuitry of the motor for operation of the motor under power supplied by a three-phase low voltage power supply. The high-voltage jumper cap is used to make the necessary electrical connections in the external circuitry of the motor for operation of the motor under power supplied by a three-phase high-voltage power supply.

PATENTED AUG 31 1971 3,602,748
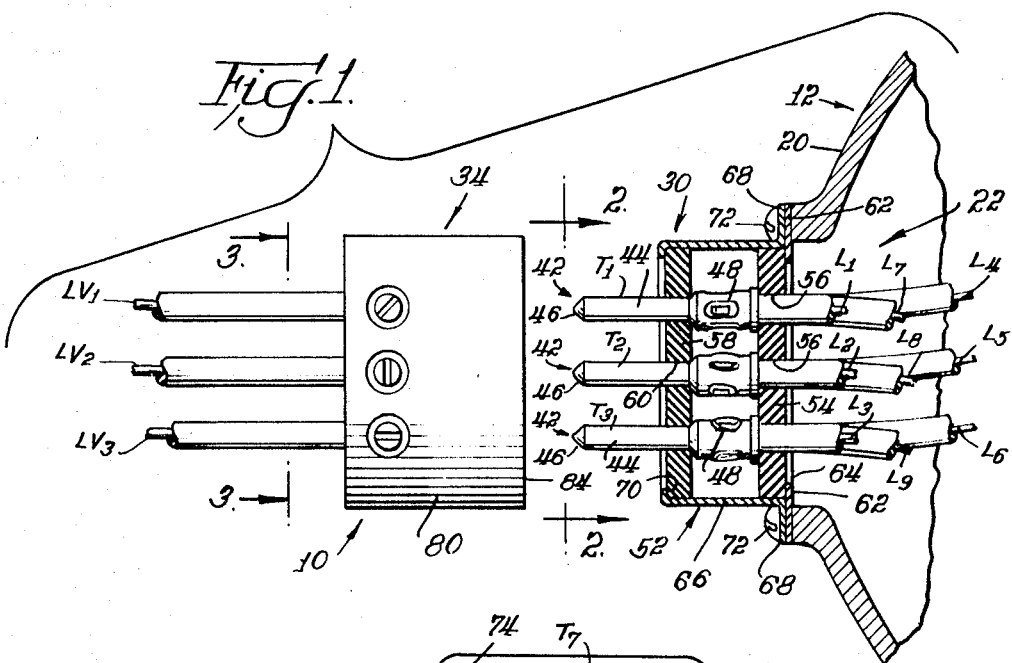
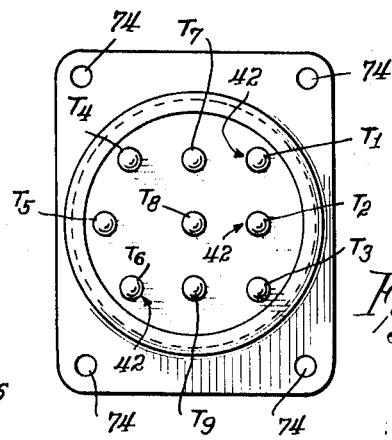
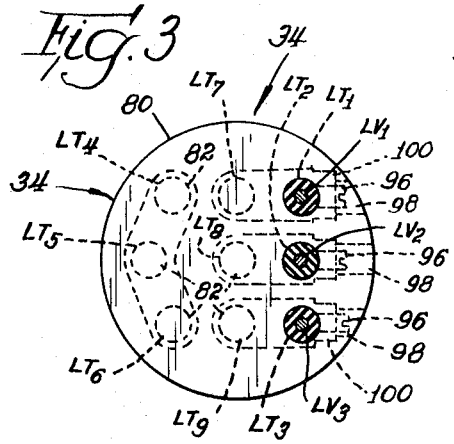
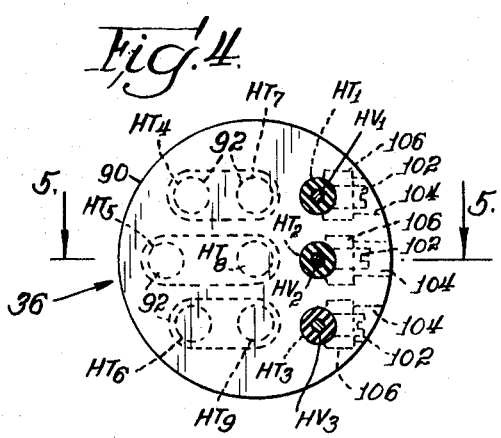
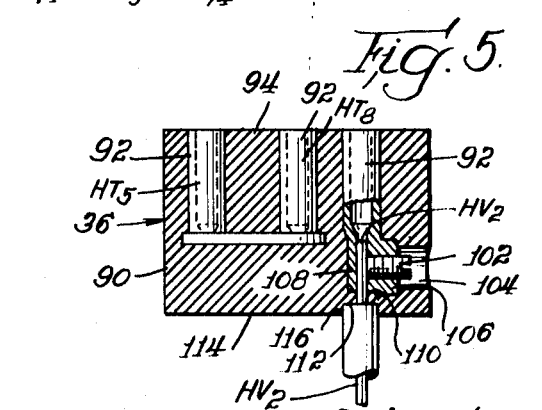
Inventor
Gilbert I. Locke
By Brown, Jackson,
Boettcher + Dienner Att'ys

DOUBLE-VOLTAGE MOTOR CONNECTING DEVICE

BACKGROUND OF THE INVENTION

This invention pertains to a connecting device for use in making electrical connections in the external circuitry of a three-phase double-voltage motor, alternatively for operation of the motor under power supplied by a three-phase low-voltage power supply and for operation of the motor under power supplied by a three-phase high-voltage power supply.

Many portable motor-driven devices, for example, welding machines, are designed for operation under three-phase power supplied alternatively at a lower voltage and at a higher voltage—typically, at 220 v. and at 440 v. This feature is particularly advantageous in devices which frequently must be moved from plant site to plant site, or from construction site to construction site, where power may be available only at one or the other voltage.

As is known to those skilled in the art, the external circuitry of a conventional three-phase double-voltage motor comprises nine external leads taken from the motor itself together with three leads taken from an available three-phase power supply. By conventional practice among the manufacturers, the alternative electrical connections to be made in the external circuitry of such a motor have been standardized. One skilled in the art is familiar with the standardized electrical connections to be made, either for operation of the motor under power supplied at the lower voltage of the motor or for operation of the motor under power supplied at the higher voltage of the motor. It is the present practice in the art to make such electrical connections individually, and by hand, often with hand-splicing techniques.

It is not uncommon for an inexperienced person to commit costly errors in making electrical connections in the external circuitry of such a motor, both among the external leads of the motor itself and between the external leads of the motor and the leads of the available power supply, particularly in an instance in which it is necessary to change previously made electrical connections among the external leads of the motor in order to convert the motor either from low-voltage operation to high-voltage operation or from high-voltage operation to low-voltage operation. For example, if two leads of the power supply were to interchanged, the direction of the motor would be reversed. Likewise, if the external leads of the motor were to be interchanged, serious overloads in the windings of the motor possibly would occur. Frequently, such errors may be traced to improper or inadequate markings on the respective external leads of the motor.

SUMMARY OF THE INVENTION

It is the principal object of this invention to provide a connecting device for use in making electrical connections in the external circuitry of a three-phase double-voltage motor, alternatively for operation of the motor under power supplied by a three-phase low-voltage power supply and for operation of the motor under power supplied by a three-phase high-voltage power supply.

It is a more particular object of this invention to provide a connecting device which even when used by an inexperienced person substantially eliminates the possibility of error in making electrical connections in the external circuitry of the motor.

It is another object of this invention to provide a connecting device which substantially reduces the time required for converting a three-phase double-voltage motor either from low-voltage operation to high-voltage operation or from high-voltage operation to low-voltage operation.

It is yet another object of this invention to provide a connecting device which substantially reduces the time required for interchanging two or more three-phase double-voltage motors at a particular three-phase power supply.

Other related objects of this invention are to provide a connecting device which may be used as quick-disconnect means, particularly in an instance in which the motor is remote from or out of sight of the control panel for the power supply serving the motor, to provide a connecting device which permits solderless connections to be made at the external leads of the motor, and to provide a connecting device which may be readily installed on an existing motor.

In accordance with the principles of this invention, the preceding objects may be attained in a connecting device comprising a receptacle having nine terminals in combination with low-voltage and high-voltage jumper caps respectively having nine terminals. The respective jumper caps are adapted to be removably and interchangeably mounted to the receptacle in such a manner as to place each terminal of the respective jumper caps into electrical contact with a specified one of the terminals of the receptacle. Each terminal of the receptacle is adapted to be electrically connected to a specified one of the external leads of the motor. Each of three of the terminals of the low-voltage jumper cap is adapted to be electrically connected to a specified one of the leads of the low-voltage power supply. The respective terminals of the low-voltage jumper cap have specified common connections permitting the motor to be operated under power supplied by the low-voltage power supply. Each of three of the terminals of the high-voltage jumper cap is adapted to be electrically connected to a specified one of the leads of the high-voltage power supply. The terminals of the high-voltage jumper cap have specified common connections permitting the motor to be operated under power supplied by the high-voltage power supply. The respective jumper caps are designed to follow the previously mentioned conventional practice by which the alternative electrical connections to be made in the external circuitry of the motor have been standardized, both in the low-voltage jumper cap for operation of the motor under power supplied at the lower voltage of the motor and in the high-voltage jumper cap for operation of the motor under power supplied at the higher voltage of the motor.

Furthermore, within the low-voltage jumper cap, each of three of the remaining terminals has a common connection with a specified one of the aforementioned three terminals, and the further remaining three terminals have a common connection with each other. Likewise, within the high-voltage jumper cap, each of the remaining terminals has a common connection with a specified other one of the remaining terminals. These features reflect the conventional practice previously mentioned.

In the preferred form of the connecting device of this invention, the respective terminals of the low-voltage jumper cap are adapted to be mated with the respective terminals of the receptacle in such a manner as to removably mount the low-voltage jumper cap to the receptacle. Likewise, the respective terminals of the high-voltage jumper cap are adapted to be mated with the respective terminals of the receptacle in such a manner as to removably mount the high-voltage jumper cap to the receptacle. Thus, the respective jumper caps may be mounted to the receptacle interchangeably and in like manner.

Preferably, each terminal of the respective jumper caps comprises a female terminal socket, and each terminal of the receptacle comprises a male terminal plug. In that instance, permanent solderless connections may be made at the external leads of the motor. Preferably, in the same instance, the receptacle has a body which is separable into plural parts in order to permit removal and replacement of the respective male terminal plugs, and each male terminal plug has a pin portion, which extends outwardly from the body, and a shank portion, which is confined by the body.

These and other objects, features, and advantages of this invention are evident from the following description, with the aid of the attached drawing, of a preferred embodiment of this invention.

BRIEF DESCRIPTION OF THE DRAWING

In the drawing:

FIG. 1 is an exploded side elevational view, partly in section, of a connecting device embodying the principles of this invention, showing the receptacle attached to the housing of a three-phase double-voltage motor and showing one of the jumper caps in exploded relation thereto;

FIG. 2 is an elevational view, taken substantially along line 2—2 of FIG. 1 in the direction of the arrows, showing the receptacle apart from the housing of the motor;

FIG. 3 is a sectional view, taken substantially along line 3—3 of FIG. 1 in the direction of the arrows;

FIG. 4 is a view, similar to FIG. 3, showing the other jumper cap; and

FIG. 5 is a sectional view, taken substantially along line 5—5 of FIG. 4.

DESCRIPTION OF THE PREFERRED EMBODIMENT

In FIG. 1, there is shown a connecting device, indicated generally at 10, constituting a preferred embodiment of this invention. The connecting device 10 is designed for use in making electrical connections in the external circuitry of a three-phase double-voltage motor, such as the motor indicated fragmentarily at 12, alternatively for operation of the motor under power supplied by a three-phase low-voltage power supply and for operation of the motor under power supplied by a three-phase high-voltage power supply.

The motor 12 may be assumed to be an example of a conventional three-phase double-voltage motor, such as may be used to drive a portable welding machine, and has nine external leads, which conventionally are numbered respectively from one through nine. Herein, the external leads of the motor 12 are designated respectively as $L_1$ through $L_9$. The motor 12 is designed to be operated alternatively under power supplied at a given lower voltage and under power supplied at a given higher voltage. Typically, the respective lower and higher voltages of such a motor are 220 v. and 440 v. As shown, the motor 12 has a housing 20, in which an enlarged opening 22 is provided for access to the external leads of the motor 12. In FIGS. 1 and 3, three leads of a conventional three-phase low-voltage power supply (not shown) are designated respectively as $LV_1$ through $LV_3$. In FIG. 4, three leads of a conventional three-phase high-voltage power supply (not shown) are designated respectively as $HV_1$ through $HV_3$. Herein, it may be assumed that the low-voltage power supply is adapted to supply power to the motor 12 at the lower voltage at which the motor 12 may be operated, and that the high-voltage power supply is adapted to supply power to the motor 12 at the higher voltage at which the motor 12 may be operated. Further details of the motor 12 and of suitable power supplies, except as are set forth herein, are beyond the scope of the present disclosure and may be supplied readily by those skilled in the art.

The connecting device 10 generally comprises a receptacle 30, which is mounted to the housing 20 of the motor 12, over the opening 22, in a manner to be described hereinafter, and a pair of jumper caps, indicated respectively at 34 and at 36. The respective jumper caps 34 and 36 are adapted to be removably and interchangeably mounted to the housing 20 of the motor 12. Herein, in reference to their respective functions, the jumper cap 34 is referred to as the low-voltage jumper cap, and the jumper cap 36 is referred to as the high-voltage jumper cap.

The receptacle 30 has nine terminals, which are numbered respectively from one through nine in order to correspond in enumeration to the external leads of the motor 12. Herein, the terminals of the receptacle 30 are designated respectively as $T_1$ through $T_9$. The receptacle 30 is adapted to be mounted to the housing 20 of the motor 12, over the opening 22, in a manner to be described hereinafter. But for internal common connections to be described hereinafter, the low-voltage jumper cap 34 and the high-voltage jumper cap 36 are similar. The low-voltage jumper cap has nine terminals, which are numbered respectively from one through nine in order to correspond in enumeration to the external leads of the motor 12 and to the terminals of the receptacle 30. Herein, the terminals of the low-voltage jumper cap 34 are designated respectively at $LT_1$ through $LT_9$. The low-voltage jumper cap 34 is adapted to be removably mounted to the receptacle 30 in such a manner as to place each terminal of the low-voltage jumper cap 34 into electrical contact with the correspondingly numbered terminal of the receptacle 30. The high-voltage jumper cap 36 has nine terminals which are numbered also from one through nine in order to correspond in enumeration to the external leads of the motor 12 and to the terminals of the receptacle 30. Herein, the terminals of the high-voltage jumper cap 36 are designated respectively as $HT_1$ through $HT_9$. The high-voltage jumper cap 36 is adapted to be removably mounted to the receptacle 30 in such a manner as to place each terminal of the high-voltage jumper cap 36 into electrical contact with the correspondingly numbered terminal of the receptacle 30.

Each terminal of the receptacle 30 is adapted to be electrically connected to the correspondingly numbered external lead of the motor 12. As shown, each terminal of the receptacle 30 comprises a male terminal plug 42 having a pin portion 44, which is generally cylindrical but for a generally conical tip 46 and a shank portion 48, which is larger in cross section than the pin portion 44. The shank portion 48 of each has an axial opening (not shown) adapted to receive the specified external lead of the motor 12 and is adapted to be crimped onto the lead, as shown, for electrical connection to the lead.

The receptacle 30 has a body 52 which is separable into plural parts in order to permit removal and replacement of the respective male terminal plugs 42. As shown, the body 52 comprises an inner dielectric disc 54, which has nine suitably spaced openings 56 for the external leads of the motor 12, an outer dielectric disc 58, which has nine similarly spaced openings 60 for the pin portions 44 of the male terminal plugs 42, a generally rectangular inner retaining plate 62, which has an enlarged circular opening 64 for the external leads of the motor 12, and a sleeve member 66, which has a generally rectangular inner mounting flange 68 and a generally annular outer retaining lip 70. Each of the external leads of the motor 12 is extended outwardly through a specified one of the openings 56 in the inner dielectric disc 54. The pin portion 44 of each male terminal plugs 42 is extended through a specified one of the openings 60 in the outer dielectric disc 58. The shank portion 48 of each male terminal plugs 42 is confined between the dielectric discs 54 and 58. The respective dielectric discs 54 and 58 are fitted within the sleeve member 66 and are drawn against the shank portions 48 of the respective male terminal plugs 42 between the outer retaining lip 70 of the sleeve member 66 and the inner retaining plate 62. The receptacle 30 is mounted to the housing 20 of the motor 12, over the opening 22, by means of a plurality of screws 72 passing through suitably openings 74 (FIG. 2) in the inner mounting flange 68 of the sleeve member 66, and through aligned openings (not shown) in the inner retaining plate 62, and threadably engaging aligned suitably threaded sockets (not shown) in the housing 20 of the motor 12. By removal of the screws 72, the receptacle 30 may be dismounted for storage or transportation of the motor 12. In that instance, there is no need to remove the male terminal plugs 42 from the external leads of the motor 12.

The low-voltage jumper cap 34 has a generally cylindrical molded dielectric body 80 into which the nine terminals are embedded. Each terminal of the low-voltage cap member 34 comprises a female terminal socket 82, which is open at one face 84 of the body 80, and is adapted to be mated with the correspondingly numbered terminal of the receptacle 30 for electrical contact therewith. When the correspondingly numbered terminals are mated, the pin portions 44 of the respective male terminal plugs 42 are received by the respective female terminal sockets 82 in such a manner as to removably mount the low-voltage jumper cap 34 to the receptacle. The high-voltage jumper cap 36 similarly has a generally cylindrical molded dielectric body 90 into which the nine terminals are embedded. Each terminal of the high-voltage jumper cap 36 comprises a female terminal socket 92, which is open at one face 94 of the body 90, and is adapted to be mated with the correspondingly numbered terminal of the receptacle 30 for electrical contact therewith. When the correspondingly numbered terminals are mated, the pin portions 44 of the respective male terminal plugs 42 are received by the respective female terminal sockets 92 in such a manner as to removably mount the high-voltage cap member 36 to the plug member 30. The respective male terminal plugs 42 and the respective female terminal sockets 82 and 92 are spatially arranged in such a manner as to permit the low-voltage jumper cap 34 to be successfully mounted to the receptacle 30, as mentioned, only if each male terminal plug 42 is mated with the correspondingly numbered female terminal socket 82, and to permit the high-voltage jumper cap 36 to be successfully mounted to the receptacle 30, as mentioned, only if each male terminal plug 42 is mated with the correspondingly numbered female terminal socket 92. As shown, the respective male terminal plugs 42 are arranged in a pattern of squares but for the one serving as terminal $T_5$, and the respective female terminal sockets 82 and 92 are arranged correspondingly.

As previously mentioned, by conventional practice, the alternative electrical connections to be made in the external circuitry of the motor have been standardized. Herein, the standardized alternative electrical connections are to be made in the external circuitry of the motor 12.

Following the aforementioned conventional practice, each of the first three enumerated terminals of the low-voltage jumper cap 34, terminals $LT_1$ through $LT_3$, is adapted to be electrically connected to the correspondingly numbered lead of the low-voltage power supply, and each of the corresponding terminals of the high-voltage jumper cap 36, terminals $HT_1$ through $HT_3$, is adapted to be electrically connected to the correspondingly numbered lead of the high-voltage power supply. As shown, the leads of the low-voltage power supply are held in electrical contact with the first three enumerated terminals of the low-voltage jumper cap 34 by means of setscrews 96 entering parallel peripheral sockets 98 in the body 80 and threadably engaging suitably threaded bushings 100 which are imbedded in the body 80. Similarly, the leads of the high-voltage power supply are held in electrical contact with the first three enumerated terminals of the high-voltage jumper cap 36 by means of setscrews 102 entering parallel peripheral sockets 104 in the body 90 and threadably engaging suitably threaded bushings 106 which are embedded in the body 90. By way of example, FIG. 5 further illustrates the manner in which lead $HV_2$ of the high-voltage power supply is held in electrical contact with terminal $HT_2$ of the high-voltage cap member 36. A generally tubular conductive sleeve 108, which is permanently electrically connected to and may be formed in one piece with the female terminal socket 92 serving as terminal $HT_2$, is embedded in the body 90 and has a lateral opening 110 in communication with the bushing 106. The sleeve 108 is open at a pocket 112 in the remaining face 114 of the body 90 and is adapted to receive lead $HV_2$, as shown, for engagement of lead $HV_2$ by the setscrew 102 through the lateral opening 110. In order to minimize electrical shock hazards, the setscrew 102 lies fully within the socket 104 when engaging with the lead $HV_2$, and an insulatively covered portion 116 of the lead $HV_2$ is received by the pocket 112 in the face 114 of the body 90 when the lead $HV_2$ is received by the sleeve 108.

Further following the same conventional practice, each of three of the remaining terminals of the low-voltage jumper cap 34 has a common connection with a specified one of the first three enumerated terminals thereof, and the further remaining terminals thereof have a common connection with each other. Specifically, terminal $LT_1$ has a common connection with terminal $LT_7$, terminal $LT_2$ has a common connection with terminal $LT_8$, terminal $LT_3$ has a common connection with terminal $LT_9$, and terminal $LT_5$ has a common connection both with terminal $LT_4$ and with terminal $LT_6$. As shown, the respective common connections are provided by a strip conductors 120 which are embedded in the body 80. The respective strip conductors 120 are permanently electrically connected to the specified terminals, preferably by means of metallurgical bonding.

Likewise, each of the terminals of the high-voltage jumper cap 36 other than the first three enumerated terminals has a common connection with a specified other one of the same terminals. Specifically, terminal $HT_8$ has a common connection with terminal $HT_5$, and terminal $HT_9$ has a common connection with terminal $HT_6$. As shown, the respective common connections are provided by strip conductors 122 which are imbedded in the body 90. The respective strip conductors 122 are permanently electrically connected to the specified terminals, preferably by means of metallurgical bonding.

In the manner described hereinbefore, the connecting device 10 may be used in making electrical connections in the external circuitry of a three-phase double-voltage motor, such as the motor 12, alternatively for operation of the motor alternatively under power supplied at the lower voltage of the motor and for operation of the motor under power supplied at the higher voltage of the motor. In the former instance, the receptacle 30 is used in combination with the low-voltage jumper cap 34. In the latter instance, the receptacle 30 is used in combination with the high-voltage jumper cap 36. The connecting device 10 substantially reduces the time required for converting a three-phase double-voltage motor, such as the motor 12, either from low-voltage operation to high-voltage operation or from high-voltage operation to low-voltage operation and substantially reduces the time required for interchanging two or more three-phase double-voltage motors at a particular three-phase power supply. The connecting device 10 also may be used as quick-disconnect means, particularly in an instance in which the motor is remote from or out of sight of the control panel for the power supply serving the motor. Furthermore, owing to the use of solderless connections at the external leads of the motor, the connecting device 10 may be readily installed on an existing motor.

Modifications of the proportions and arrangements of the parts may be made in order to meet applicable electrical codes and underwriters' requirements. Other modifications and improvements may be suggested by present disclosure to those skilled in the art. Accordingly, the scope of this invention should be determined from the following claims.

I claim:

1. In a connecting device for use in making electrical connections in the external circuitry of a three-phase double-voltage motor having nine external leads connectable for alternative operation of the motor under power supplied by a three-phase low-voltage power supply having three leads, and for operation of the motor under power supplied by a three-phase high-voltage power supply having three leads, the combination comprising a receptacle having nine fixedly positioned terminals, each terminal of said receptacle being adapted to be electrically connected to a specified one of the external leads of the motor, and low-voltage and high-voltage jumper caps each having nine identically positioned terminals, said jumper caps being adapted to be removably and interchangeably mounted on said receptacle in a manner to place each terminal of the respective jumper caps into electrical contact with a specified one of the terminals of said receptacle, three of the terminals of said low-voltage jumper cap each being adapted to be electrically connected to a specified one of the leads of the low-voltage power supply, the remaining terminals of said low-voltage jumper cap being selectively connected in a manner to effect operation of the motor when said low-voltage jumper cap is mounted on said receptacle and connected to the low-voltage power supply, three of the terminals of said high-voltage jumper cap each being adapted to be electrically connected to a specified one of the leads of the high-voltage power supply, the terminals of said high-voltage jumper cap being selectively connected in a manner to effect operation of the motor when said high-voltage cap is mounted on said receptacle and connected to the high-voltage power supply, the terminals of said receptacle and said jumper caps selectively comprising male terminal plugs and female terminal sockets cooperable to effect electrical connection therebetween, said receptacle including a body comprising a casing retaining spaced disc means therein, each male terminal plug having a pin portion which extends outwardly from said body for connection to a terminal of a jumper cap, and a shank portion confined between said spaced disc means, said casing and disc means being separable to permit removal and replacement of said male terminal plugs.

2. The combination of claim 1 wherein the shank portion of each male terminal plug has an opening adapted to receive one of the external leads of the motor and is adapted to be crimped onto said lead for electrical connection to said lead.

3. The combination of claim 1 wherein said male terminal plugs of said receptacle have at least one male plug positioned in irregular relation to the remaining of said male terminal plugs, and wherein the female terminal sockets of said jumper caps are positioned for mating cooperation with the male terminal plugs of said receptacle.

4. In a connecting device for use in making electrical connections in the external circuitry of a three-phase double-voltage motor having nine external leads connectable for alternative operation of the motor under power supplied by a three-phase low-voltage power supply having three leads, and for operation of the motor under power supplied by a three-phase high-voltage power supply having three leads, the combination comprising a receptacle having nine fixedly positioned terminals, each terminal of said receptacle being adapted to be electrically connected to a specified one of the external leads of the motor, and low-voltage and high-voltage jumper caps each having nine identically positioned terminals, said jumper caps being adapted to be removably and interchangeably mounted on said receptacle in a manner to place each terminal of the respective jumper caps into electrical contact with a specified one of the terminals of said receptacle, three of the terminals of said low-voltage jumper cap each being adapted to be electrically connected to a specified one of the leads of the low-voltage power supply, the remaining terminals of said low-voltage jumper cap being selectively connected in a manner to effect operation of the motor when said low-voltage jumper cap is mounted on said receptacle and connected to the low-voltage power supply, three of the terminals of said high-voltage jumper cap each being adapted to be electrically connected to a specified one of the leads of the high-voltage power supply, the remaining terminals of said high-voltage jumper cap being selectively connected in a manner to effect operation of the motor when said high-voltage cap is mounted on said receptacle and connected to the high-voltage power supply, the terminals of said receptacle comprising male terminal plugs and the terminals of said jumper caps comprising female terminal sockets, the three terminals of the low-voltage jumper cap which are adapted to be electrically connected to the leads of the low-voltage power supply and the three terminals of the high-voltage jumper cap which are adapted to be electrically connected to the leads of the high-voltage power supply being adapted to be placed into electrical contact with the same terminals of said receptacle when the respective jumper caps are mounted on said receptacle.

5. The combination of claim 4 wherein, within said low-voltage jumper cap, each of three of the remaining terminals is electrically connected to one of the three terminals which are adapted to be electrically connected to the leads of said low-voltage power supply, and wherein the further remaining three terminals of said low-voltage jumper cap are interconnected with each other.

6. The combination of claim 4 wherein, within said high-voltage jumper cap, the remaining six terminals are selectively electrically connected in pairs of two.

UNITED STATES PATENT OFFICE
CERTIFICATE OF CORRECTION

Patent No. 3,602,748      Dated August 31, 1971

Inventor(s) Gilbert I. Locke

It is certified that error appears in the above-identified patent and that said Letters Patent are hereby corrected as shown below:

Column 6, line 71 (by actual count), before "terminals"

insert -- remaining --.

Signed and sealed this 14th day of November 1972.

(SEAL)
Attest:

EDWARD M. FLETCHER, JR.
Attesting Officer

ROBERT GOTTSCHALK
Commissioner of Patents